United States Patent [19]
Le et al.

[11] Patent Number: 6,008,962
[45] Date of Patent: *Dec. 28, 1999

[54] METHOD AND APPARATUS FOR PROVIDING READ AND WRITE SKEW OFFSET INFORMATION FOR A MAGNETO-RESISTIVE HEAD

[75] Inventors: Me Van Le, Milpitas; Jong-Ming Lin, Cupertino, both of Calif.

[73] Assignee: Samsung Electronics Co., Ltd., Suwon, Rep. of Korea

[*] Notice: This patent issued on a continued prosecution application filed under 37 CFR 1.53(d), and is subject to the twenty year patent term provisions of 35 U.S.C. 154(a)(2).

[21] Appl. No.: 08/641,685

[22] Filed: May 1, 1996

[51] Int. Cl.$^6$ .................................................. G11B 5/596
[52] U.S. Cl. ..................... 360/77.08; 360/77.04; 360/48
[58] Field of Search ............................. 360/77.02, 77.04, 360/77.06, 77.08, 77.11, 77.07, 78.14, 48, 53, 62, 31

[56] References Cited

U.S. PATENT DOCUMENTS

| | | | |
|---|---|---|---|
| 4,890,172 | 12/1989 | Watt et al. | 360/77.04 |
| 5,053,899 | 10/1991 | Okawa et al. | 360/77.08 |
| 5,210,662 | 5/1993 | Nishijima | 360/77.08 X |
| 5,408,367 | 4/1995 | Emo | 360/53 |
| 5,500,776 | 3/1996 | Smith | 360/77.04 |
| 5,523,902 | 6/1996 | Pederson | 360/77.08 |
| 5,587,850 | 12/1996 | Ton-that | 360/77.08 |
| 5,608,587 | 3/1997 | Smith | 360/77.08 |
| 5,659,436 | 8/1997 | Yarmchuk et al. | 360/77.08 X |
| 5,680,270 | 10/1997 | Nakamura | 360/77.07 X |
| 5,691,857 | 11/1997 | Fitzpatrick et al. | 360/65 X |

*Primary Examiner*—Andrew L. Sniezek
*Attorney, Agent, or Firm*—Blakely, Sokoloff, Taylor & Zafman; Jeffrey Aiello

[57] ABSTRACT

The present invention is a method and apparatus for generating a skew or position offset signal for aligning the read element of an MR head with the centerline of written data, during a read operation. The disk has a plurality of tracks, one of which contains a calibration burst that allow the read element to be centered with the centerline of written data. This is accomplished by first writing the calibration burst on a predetermined number of sectors of the track. A profile of the calibration burst is obtained by micro-jogging the head from a first position that is −50% from the track centerline to a second position that is +50% of the track centerline, and sensing the magnitude of the calibration burst in various increments between the first and the second positions. For each microjogging position, the magnitude of the calibration burst is obtained. The microjogging position corresponding to the peak value of the calibration burst represents the offset between the read and the write elements. The offset signal is stored in memory and used in a servo routine to center the MR head during a read operation. The calibration burst may be included in a single track, a predetermined number of tracks, or on every track of the disk.

7 Claims, 9 Drawing Sheets

FIG. 7A-(2) 170 SERVO GATE

FIG. 7A-(3) 172 A,B,C,D,E BURSTS WINDOW

FIG. 7A-(4) 174 DISCHARGE

FIG. 8-(2) SERVO GATE

FIG. 8-(3) A,B,C,D,E BURSTS WINDOW

FIG. 8-(4) DISCHARGE

METHOD AND APPARATUS FOR PROVIDING READ AND WRITE SKEW OFFSET INFORMATION FOR A MAGNETO-RESISTIVE HEAD

BACKGROUND OF THE INVENTION

1. Field of the Invention

The present invention relates in general to disk storage systems and more particularly, to a method and apparatus for providing skew offset information for aligning the read element of a magneto-resistive (MR) head with the centerline of written data during a read operation.

2. Description of the Related Art

Disk drives are magnetic recording devices used for the storage of information. The information is recorded on concentric tracks on either surface of one or more magnetic recording disks. The disks are rotatably mounted to a spin motor and information is accessed by means of read/write heads that are mounted to actuator arms which are rotated by a voice coil motor. The voice coil motor is excited with a current to rotate the actuator and move the heads. The read/write heads must be accurately aligned with the storage tracks on the disk to ensure proper reading and writing of information.

To accurately write and read data, it is desirable to maintain the head on the center of the track. To assist in controlling the position of the head, each sector of the disk typically contains a number of servo bits accurately located relative to the centerline of the track. The signals produced by the servo bits are typically demodulated into position offset signals which are used to determine the position of the head relative to the track, and to move the actuator arm if the head is not located on the track centerline.

Dual element transducers are increasingly utilized in hard disk drives because they are lighter than single element transducers. Dual element transducers include a single write element and a separate read element which is constructed from a magneto-resistive material. Such dual element transducers are commonly referred to as magneto-resistive (MR) heads.

Because of manufacturing tolerances, the separate magneto-resistive read element may be off-center from the write element of the head. Therefore, if data is written off the center of the track, to read the data, the servo system must move the head slightly off-center so that the read element is centered with the written data.

Figure 1A:
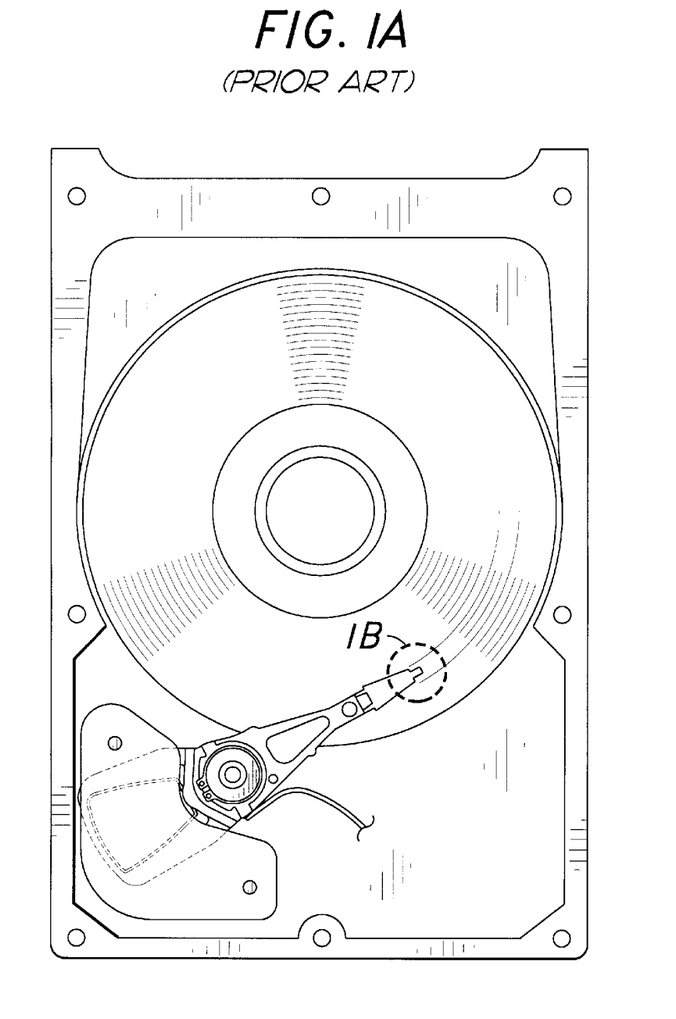
FIG. 1A illustrates a read/write head positioned over a track along the outer diameter of a disk of the prior art.
Figure 1B:
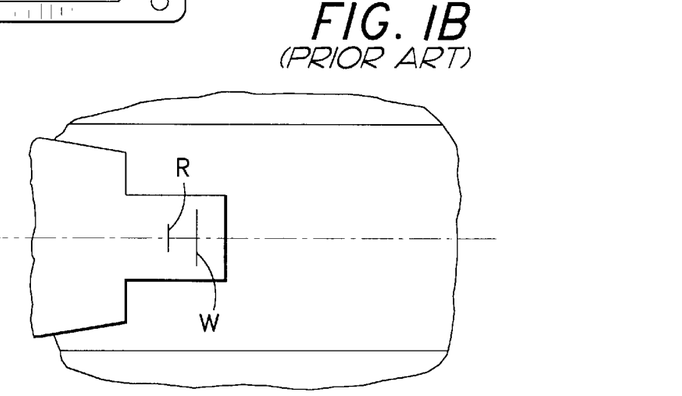
FIG. 1B is an enlarged view of the read/write head of FIG. 1A, illustrating the relative positions of a read element that is aligned with a write element on a typical magneto resistive head, in the prior art.
Figure 2A:
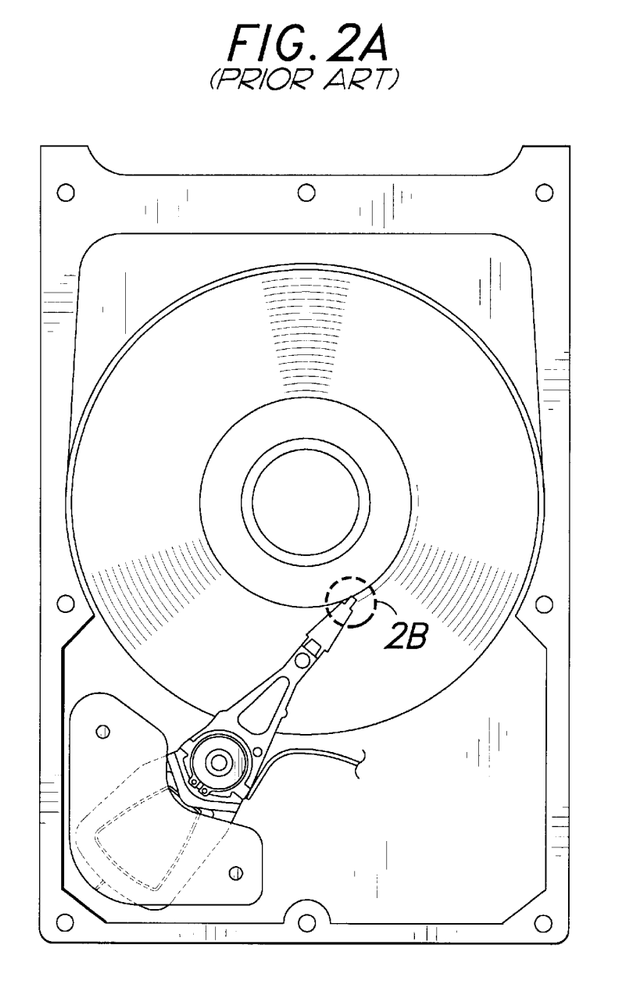
FIG. 2A illustrates a read/write head positioned over a track along the inner diameter of a disk of the prior art.
Figure 2B:
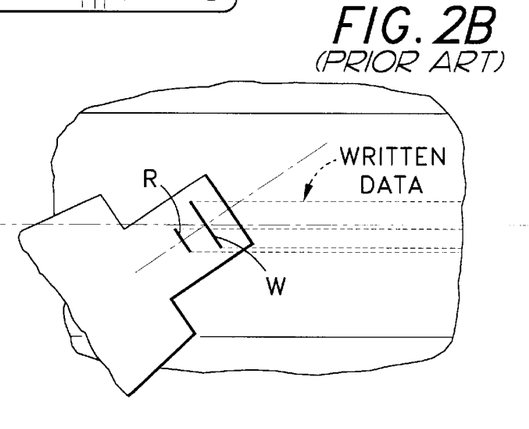
FIG. 2B is an enlarged view of the read/write head of FIG. 2A, illustrating the relative positions of a read element that is misaligned with the write element on a typical magneto resistive head, in the prior art.

Additionally, while the read and write elements may be aligned when the head is positioned over a particular track, when the head is moved to another track, the read element may no longer be aligned with the write element. For example, as shown in FIGS. 1A and 1B, when the head is positioned over a track along the outer diameter of the disk, the centers of the read and write elements (R and W respectively) are aligned. However, as shown in FIGS. 2A and 2B, when the head is positioned over a track along the inner diameter of the disk, the centers of the read R and write W elements are no longer aligned. The servo system must move the head slightly off-center, so that the read element R is centered with the written data. The routine of moving an MR head during a read operation is commonly referred to as micro-jogging.

It also has been determined that the skew offset information for an MR head located over the inner tracks of a disk is different from that of an MR head located over the outer tracks of a disk. In addition, such MR head skew offset information is typically non-linear, and it also generally varies greatly between heads.

Accordingly, there is a need in the technology for a method and apparatus for providing skew offset information used in the alignment of a magneto resistive head, so that a read element of an MR head may be aligned with the centerline of written data during a read operation.

BRIEF SUMMARY OF THE INVENTION

The present invention is a method and apparatus for generating a skew or position offset signal for aligning the read element of an MR head with the centerline of written data, during a read operation. The disk has a plurality of tracks, one of which contains a calibration burst that allow the read element to be centered with the centerline of written data. This is accomplished by first writing the calibration burst on a predetermined number of sectors of the track. A profile of the calibration burst is obtained by micro-jogging the head from a first position that is −50% from the track centerline to a second position that is +50% of the track centerline, and sensing the magnitude of the calibration burst in various increments between the first and the second positions. For each microjogging position, the magnitude of the calibration burst is obtained. The microjogging position corresponding to the peak value of the calibration burst represents the offset between the read and the write elements. The offset signal is stored in memory and used in a servo routine to center the MR head during a read operation. The calibration burst may be included in a single track, a predetermined number of tracks, or on every track of the disk.

DETAILED DESCRIPTION OF THE INVENTION

Figure 3:
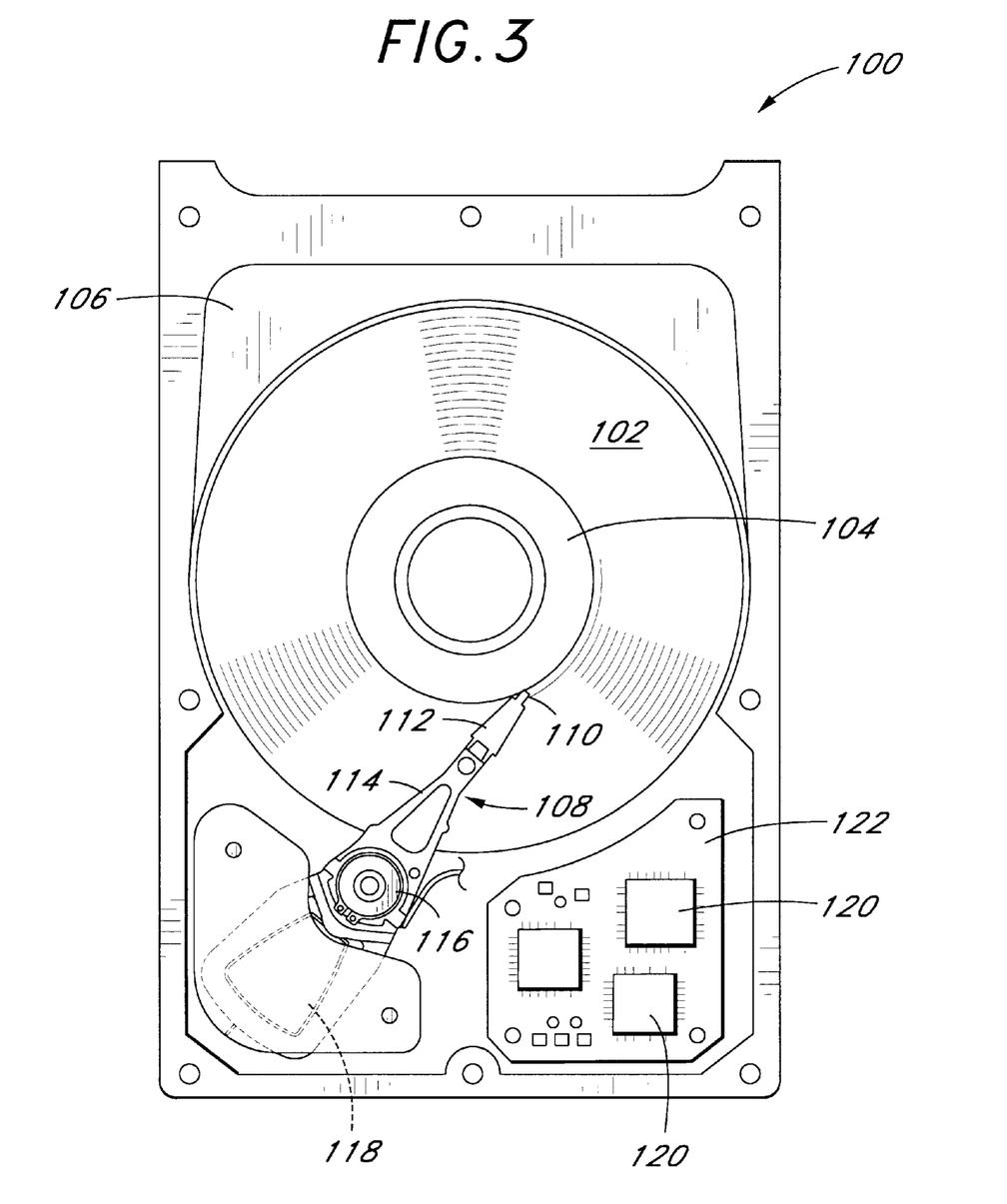
FIG. 3 illustrates a hard disk drive which utilizes the method of the present invention.

Referring to the drawings more particularly by reference numbers, FIG. 3 shows a hard disk drive 100. The disk drive 100 includes a disk 102 that is rotated by a spin motor 104. The spin motor 104 is mounted to a base plate 106. Also mounted to the base plate 106 is an actuator arm assembly 108. The actuator arm assembly 108 includes a number of heads 110 mounted to corresponding flexure arms 112. The flexure arms 112 are attached to an actuator arm 114 that can rotate about a bearing assembly 116. The assembly 108 also contains a voice coil motor 118 which moves the heads 110 relative to the disk 102. There is typically a single head for each disk surface. The spin motor 104, voice coil motor 118 and the heads 110 are coupled to a number of electronic circuits 120 mounted to a printed circuit board 122. In the following discussion, only one head 110 is referenced. The electronic circuits 120 typically include a read channel chip, a microprocessor-based controller and a random access memory (RAM) device.

Figure 4:
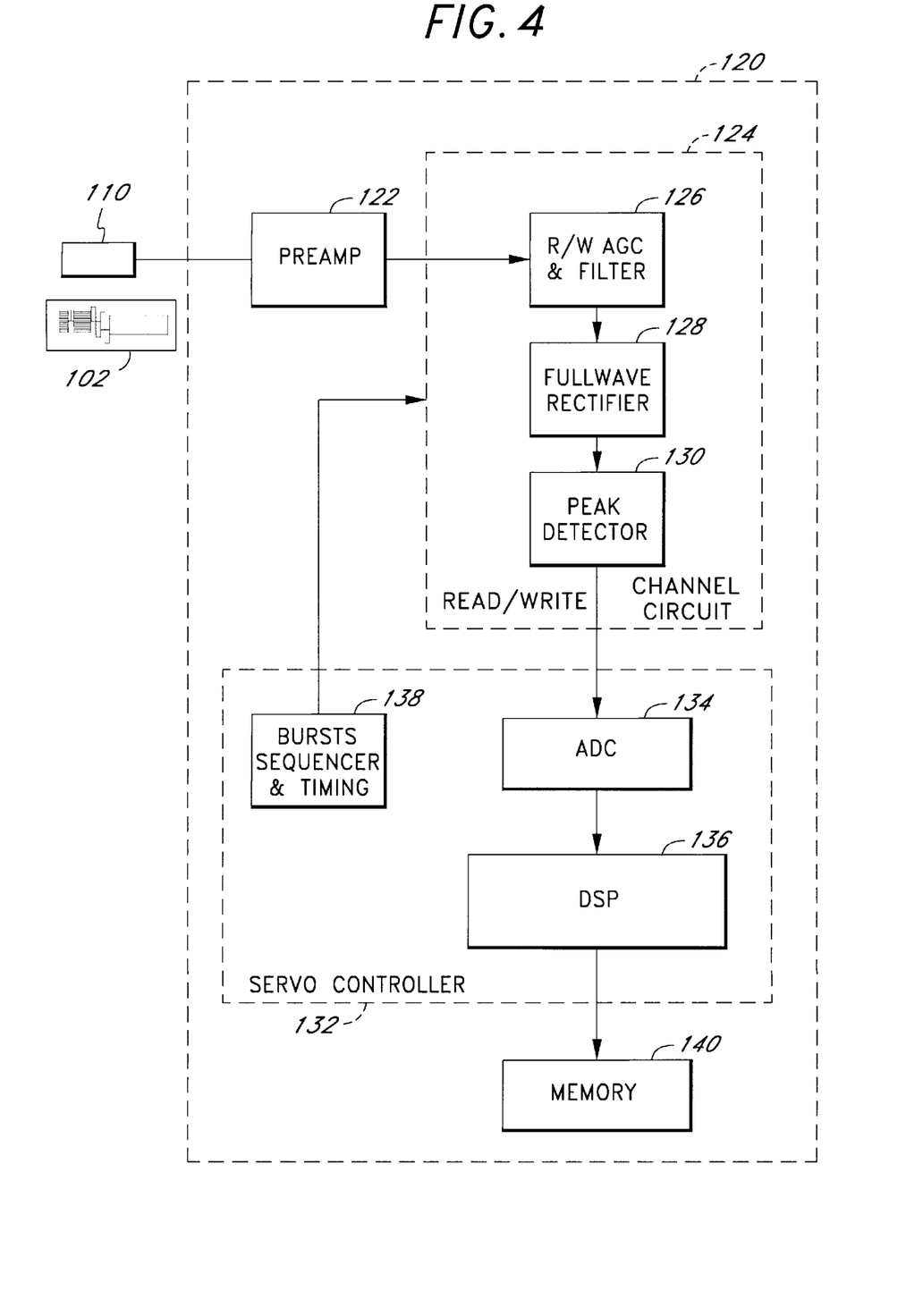
FIG. 4 is a block diagram of an integrated circuit read channel in accordance with the present invention.

FIG. 4 is a block diagram of one of the electronic circuits 120 of FIG. 3. The electronic circuit 120 includes a preamplifier 122 which is coupled to a read/write (R/W) channel circuit 124. The read/write channel circuit 124 includes a R/W Automatic Gain Control (AGC), a filter circuit 126, a fullwave rectifier 128 and a peak detector 130. The electronic circuit 120 further comprises a microprocessor-based servo controller 132 which includes an analog-to-digital converter (ADC) 134, a digital signal processor 136 and a burst sequencer & timing circuit 138. In addition, the electronic circuit 120 includes a random access memory (RAM) device 140.

The electronic circuit 120 is coupled to one of the magnetic heads 110 which senses the magnetic field of a magnetic disk 102. When reading the servo information located in the servo field region 10 on the disk 102, the head 110 generates a read signal that corresponds to the magnetic field of the disk 102. The read signal is first amplified by the preamplifier 122, and then provided to the R/W channel circuit 124. The AGC data included in the read signal is provided to the R/W AGC and filter circuit 126. The AGC data provided by the read signal is monitored by the R/W AGC circuit portion of circuit 126 and the read signal is then filtered by the filter circuit located in the circuit 126. The fullwave rectifier 138 rectifies the read signal and provides the rectified read signal to the peak detector 140. In response, the peak detector 140 detects the amplitude of the read signal. The read signal is then provided to the ADC 144 which provides digitized samples of the analog read signal. The digitized signal is then provided to a digital signal processor 146 which generates the position offset signals based on the servo information read by the head 110, as discussed in detail in the following sections. The values representing the position offset signals are stored in memory 140. The bursts sequencer and timing circuit 138 provide the timing required for the aforementioned processes.

Figure 5:
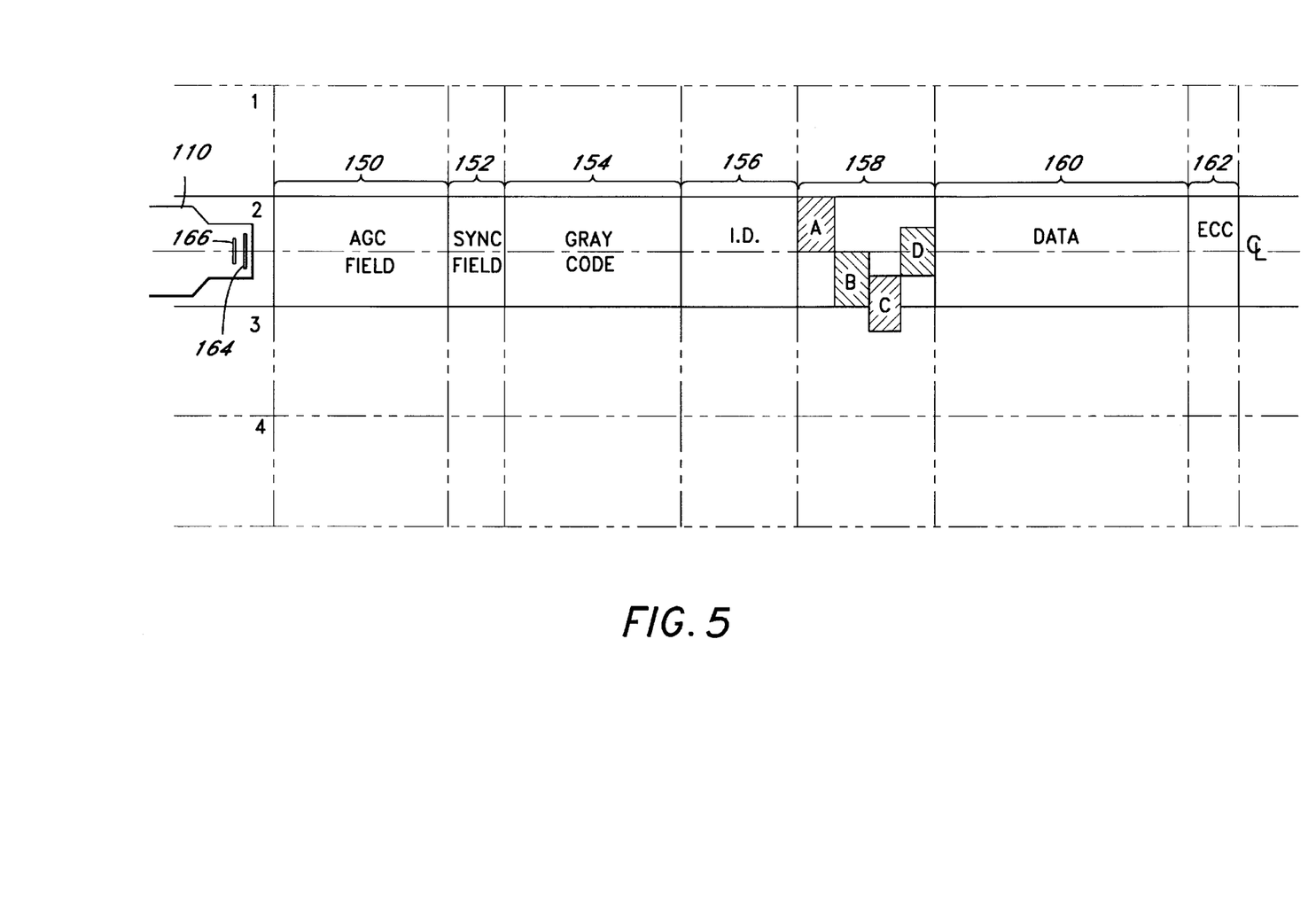
FIG. 5 illustrates a data sector of a disk.

As shown in FIG. 5, data is typically stored within sectors of radially concentric tracks located across the disk 102. A typical sector will have an automatic gain control (AGC) field 150, a synchronization (sync) field 152, a gray code field 154 that identifies the track, an identification (ID) field 156 that defines the sector, a servo field 158 which includes a number of servo bits A, B, C, D, a data field 160 which contains the data, and an error correction code field 162. The electronic circuits 120 utilize the servo bits A, B, C and D to maintain the heads 110 on the centerline CL of the track. If the heads 110 are off-center, the electronic circuits 120 will generate a position offset signal which has a voltage amplitude that varies with the distance that the heads 110 are off-set from the track centerline.

The heads 110 can magnetize and sense the magnetic field of the disk 102. In one embodiment, each head 110 has a single write element 164 and a separate read element 166 as shown in FIG. 5. The read element 166 is preferably constructed from a magneto-resistive material which changes resistance in proportion to the intensity of an external magnetic field. The read element 166 is sometimes off-set from the write element 164 because of the tolerances associated with the manufacturing process of the head. Additionally, the center of the read element 166 may be offset from the center of the write element 164 because of the skew angle of the head 110 with respect to the track on the disk 102. If the read element 166 is aligned with the center CL of the track, and the write element 164 is off-set from the read element 166, the data will be written off-center from the center CL of the track. To properly read the data, the read element 164 must be moved over to the off-center location of the written data.

Figure 6A:
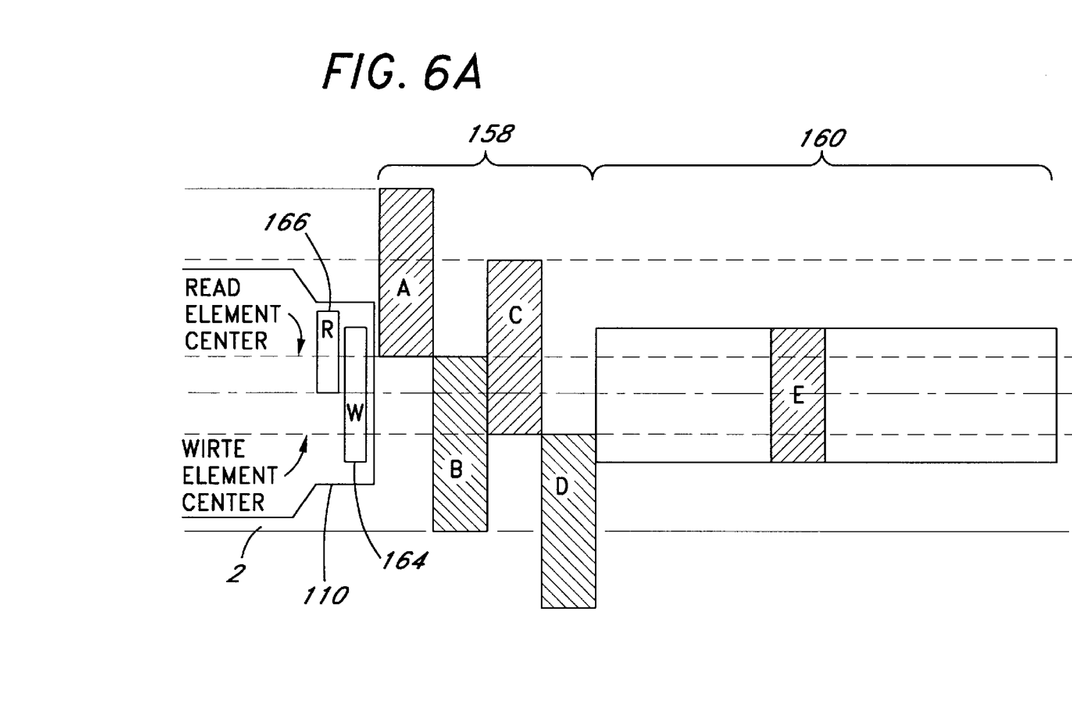
FIG. 6A is an enlarged view of a portion of the data sector of FIG. 5, illustrating the calibration burst utilized in the method of the present invention.

FIG. 6A is an enlarged view of a portion of the data sector of FIG. 5, illustrating the calibration burst R utilized in the method of the present invention. The calibration burst E is located in a calibration field and is used to generate a position offset signal. The calibration field has a calibration field center line that is offset from the track centerline. In one embodiment, the calibration burst E is written in the data field 160 of every sector on a predetermined number of tracks of the disk 102. For example, the calibration burst E may be written only on every fourth track. The number of tracks on which the calibration burst E are written may be determined by calibration accuracy requirements.

The servo field 158 in each sector contains a number of servo bits designated A, B, C and D. The boundary formed by the A and B servo bits defines a track CL of the disk 102. The center of the C servo bit is aligned with the center CL of the track. The D servo bit is offset 180° from the position of the C servo bit. The servo bits A and B are used to center the read element with the centerline CL of the dedicated track where the value of A-B corresponds to the off-track position of the head 110 if A-B is a non-zero value. This is accomplished by detecting the amplitude of the servo bursts provided by servo bits A, B, C and D using the read element 166 of the head 110. If the center of the read element 166 is not aligned with the center of the write element 164 (and thus, the center of the written data), then the servo controller 132 will generate a position offset signal using the technique of the present invention, to move the head 110 so that alignment of the center of the read element 166 with the center of the written data may be accomplished.

The distance that the head 110 has to be moved in such a situation is determined by the offset between the read element 166 and the write element 164 for a particular track. The technique of the present invention determines the magnitude of this offset through the use of a calibration burst E. The calibration burst E has a centerline located at a predetermined off-set position from the track centerline CL. The centerline of the calibration burst E is also the center of the write element 164 since the calibration bursts E are written by the write element 164 during the calibration process of the disk drive.

Figure 6B:
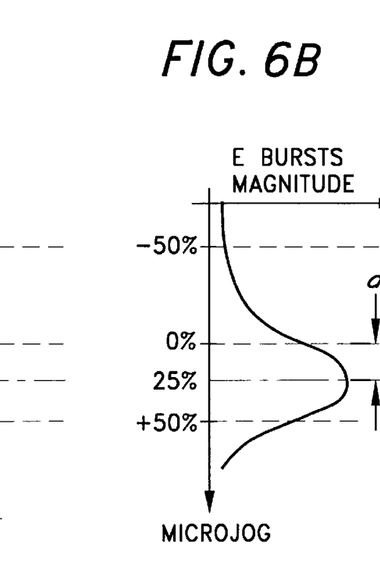
FIG. 6B is a graph illustrating the magnitude of the calibration burst with respect to the position of the read element of a magneto resistive head.

FIG. 6B is a graph illustrating the magnitude of the calibration burst E with respect to the position of the read element 166 of a magneto resistive head. Upon writing the calibration burst E in the required servo sectors, the servo controller 132 (FIG. 4) performs a seek routine by moving the head 110 from track center to track center. The profile of the calibration burst E with respect to the center CL of each track is then obtained by sampling the amplitude of the calibration burst E over the width of the track. This is done by microjogging the head 110 in increments, from a position that is −50% from the center of the track to a position that is +50% from the center of the track, and reading the amplitude of the calibration burst E. This routine is repeated for all servo sectors in which a calibration burst E has been written. The position value d corresponding to the peak value of the calibration burst E obtained during the micro-jogging process represents the offset value between the read and write elements 164 and 166, at a particular track location. Upon obtaining the offset value, the servo controller 132 will generate a demodulated position offset signal having an amplitude representative of the position offset value.

Figure 7A:
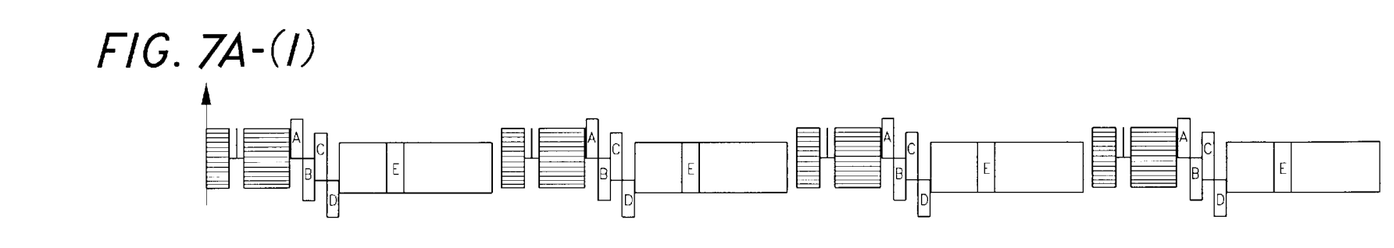
FIG. 7A illustrates a timing diagram of the servo burst sequence used in calibrating the offset values between the read and write elements in a magneto resistive head, in accordance with the teachings of the present invention.

FIG. 7A illustrates a timing diagram of the servo burst sequence used in calibrating the offset values between the read and write elements in a magneto resistive head, in accordance with the teachings of the present invention. The bursts sequencer and timing circuit 138 in the servo controller 132 controls the timing of a servo gate 170, the timing of a servo bursts A, B, C, D and E, and the discharge cycles 174 for initiating the servo bursts. During offset calibration, servo burst reading or writing is accomplished during the positive pulses of the servo gate 170. Within a single cycle of the servo gate 170, reading of servo bursts A, B, C and D is initiated at the falling edge of the first discharge pulse 174. Reading of the calibration burst E is initiated at the falling edge of the second discharge pulse 174. The offset calibration cycles continue until offset calibration for all required tracks is accomplished.

Figure 7B:
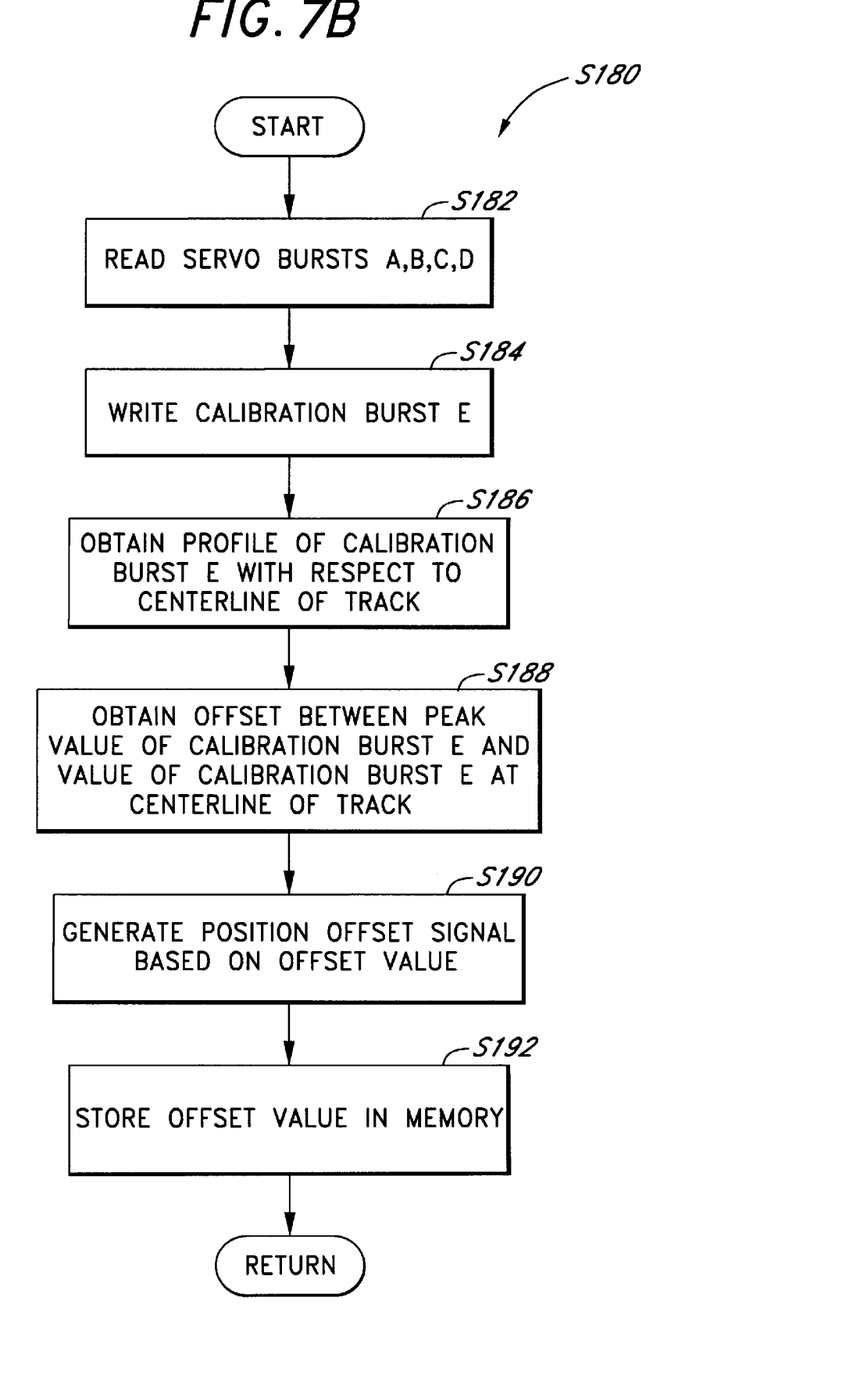
FIG. 7B is a flowchart illustrating the offset calibration technique of the present invention.

FIG. 7B is a flowchart illustrating the offset calibration process of the present invention. The offset calibration process S180 begins from a start state and proceeds to process step S182, where the read element 166 reads the servo bursts A, B, C, and D upon receiving a control signal (i.e., the falling edge of the discharge pulse 174). The servo information obtained is provided to the servo controller 132, which generates a signal for the voice coil to position the head 110 along the center of a track. The process S180 then proceeds to write the calibration burst E in the required servo sectors, as shown in process step S184.

Next, the process S180 obtains a profile of the calibration burst E with respect to the center CL of each track by sampling the amplitude of the calibration burst E over the width of the track, as shown in process step S186. This is done by first performing a seek to a position that is −50% from the center of the track, and then micro-jogging the head 110 in increments, from a position that is −50% from the center of the track to a position that is +50% from the center of the track, and reading the amplitude of the calibration burst E. The profile of the calibration burst E is stored in memory 140. This routine is repeated for all servo sectors in which a calibration burst E has been written.

The position value d corresponding to the peak value of the calibration burst E represents the offset value between the read and write elements 164 and 166, at a particular track location. The position offset signal should be ideally zero when the read element 166 is centered with the written data. If the read element 166 is off-set from the write element 164 the position offset signal has some non-zero value when the read element is centered over the written data.

Upon obtaining the offset value, the servo controller 132 will generate a position offset signal having an amplitude representative of the offset value, as shown in process step S188. The value of the position offset signal corresponding to a particular track and sector is stored in memory 140 for use during normal operation of the disk drive 100 as shown in process step S190. In one embodiment, the position offset values corresponding to the track number (as identified by gray code) and the ID number (which provides the identification of the sector number) are stored in a table for later referral. Upon completion of the calibration process, the process S180 terminates.

Figure 8:
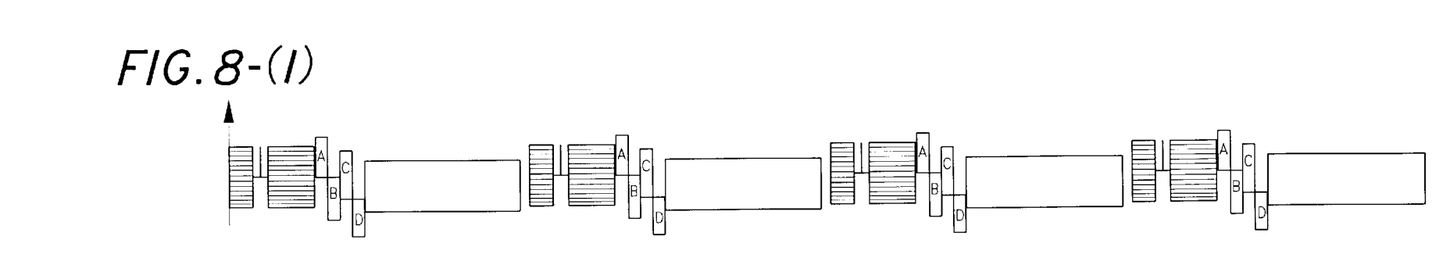
FIG. 8 illustrates a timing diagram of the servo burst sequence during normal operation of a hard disk drive, upon implementing offset calibration, in accordance with the teachings of the present invention.

FIG. 8 illustrates a timing diagram of the servo burst sequence during normal operation of a hard disk drive, after offset calibration has been performed, in accordance with the teachings of the present invention. Upon calibrating the read and write elements 166 and 164 of the head 110, normal operation of the disk drive 100 may proceed. During normal operation of a calibrated drive, the heads 110 are directly moved to the offset position in accordance with the best reading of the written data during the read operation.

The disk drive 100 typically goes through the routine of generating the position offset values after each "power-on" sequence of the drive. Alternatively, the position offset values can be generated when the disk drive 100 is initially assembled and then stored in a non-volatile memory medium such as the disk 102. Through the use of the present invention, the skew or position offset information used in the alignment of a read element of an MR head may be provided, so that the read element of an MR head may be accurately aligned with the centerline of written data during a read operation.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

We claim:

1. A method for calibrating the offset between a read element and a write element of a head in a hard disk drive, comprising:

providing a disk including a plurality of tracks each having a centerline, a first track of the plurality of tracks having a first track centerline and a servo field;

aligning the read element over the first track centerline responsive to the servo field;

writing, using the write element of the head, a first calibration burst on the first track, said calibration burst having a first calibration burst centerline that is offset from the first track centerline;

aligning the read element at a plurality of positions from the first track centerline of the first track;

sensing a magnitude of the calibration burst at each of the plurality of positions;

determining a peak value of the calibration burst from the plurality of magnitudes;

generating a position offset signal having an offset amplitude corresponding to the peak value, said position offset signal representative of the offset between the read element and the write element; and storing said position offset signal amplitude in memory.

2. The method as recited in claim 1, wherein aligning the read element at the plurality of positions from the first track centerline of the first track comprising micro-jogging the read element at the plurality of positions from the first track centerline of the first track.

3. The method as recited in claim 1, further comprising:
   aligning the read element over the first track centerline of the first track; and
   moving the read element in accordance to the position offset signal amplitude stored in memory.

4. The method as recited in claim 1, further comprising storing the magnitudes of the calibration burst in memory.

5. A method for generating a position offset signal for aligning a read element with a write element of a head, comprising:
   aligning the read element over a track centerline responsive to a servo field;
   writing a calibration burst on the track, where the calibration burst includes a calibration burst centerline that is offset from the track centerline;
   reading a magnitude of the calibration burst in each increment of a plurality of increments between a first position and a second position from the track centerline to obtain a profile of the calibration burst from the first position to the second position;
   determining a peak value of the calibration burst responsive to the profile, the peak value representing an offset value between the read element and the write element; and
   storing the offset value in a memory.

6. The method as recited in claim 5, wherein reading the magnitude of the calibration burst comprises reading the magnitude of the calibration burst in each increment between −50% from the track centerline to +50% from the track center to obtain the profile of the calibration burst.

7. The method as recited in claim 5, further comprising:
   aligning the read element over the track centerline; and
   moving the read element in accordance to the offset value stored in the memory.

* * * * *